United States Patent
Dollar

(12) United States Patent (10) Patent No.: US 6,966,276 B2
Dollar (45) Date of Patent: Nov. 22, 2005

(54) AUTOMATED WALK-THRU CATTLE SPRAYER

(76) Inventor: D. Alton Dollar, 320 Old Waters Hwy., Pine Ridge, AR (US) 71961

( * ) Notice: Subject to any disclaimer, the term of this patent is extended or adjusted under 35 U.S.C. 154(b) by 199 days.

(21) Appl. No.: 10/703,718

(22) Filed: Nov. 7, 2003

(65) Prior Publication Data

US 2005/0115515 A1 Jun. 2, 2005

(51) Int. Cl.[7] ............................................. A01K 29/00
(52) U.S. Cl. ..................... 119/667; 119/669
(58) Field of Search ................ 119/665, 666, 667, 119/669; D23/299; 4/602, 607

(56) References Cited

U.S. PATENT DOCUMENTS

| | | |
|---|---|---|
| 2,499,174 A | 2/1950 | Turner |
| 2,524,641 A | 10/1950 | Suttles |
| 2,542,280 A | 2/1951 | Knapp |
| 2,595,781 A | 5/1952 | Durham |
| 2,684,658 A | 7/1954 | Richardson et al. |
| 2,702,020 A | 2/1955 | Worden |
| 3,071,111 A | 1/1963 | Hamilton |
| 3,108,574 A | 10/1963 | Albers |
| 3,116,717 A | 1/1964 | Ragsdale |
| 3,285,231 A | 11/1966 | Johnson |
| 3,541,996 A | 11/1970 | Brockelsby et al. |
| 3,602,199 A | 8/1971 | Diggs |
| 3,763,828 A | 10/1973 | Tighe |
| 3,949,709 A * | 4/1976 | Myers .................. 119/667 |
| 4,126,104 A * | 11/1978 | Overby .................. 119/667 |
| 4,348,777 A * | 9/1982 | Peterson .................. 4/602 |
| 4,379,440 A * | 4/1983 | Thedford et al. .......... 119/669 |
| 4,669,425 A | 6/1987 | Cook |
| 4,748,939 A | 6/1988 | Cocke, Jr. |
| 4,782,792 A * | 11/1988 | Anthony et al. ............ 119/665 |
| 4,987,861 A | 1/1991 | Lemire |
| 5,063,880 A | 11/1991 | Bouthillier |
| 5,630,379 A * | 5/1997 | Gerk et al. ................ 119/667 |
| 6,029,610 A * | 2/2000 | Ramsey et al. ............. 119/667 |
| 6,095,430 A | 8/2000 | Bailey |
| 6,520,118 B2 * | 2/2003 | Swiegers et al. .......... 119/666 |
| 6,615,769 B2 * | 9/2003 | Zhioua ...................... 119/666 |
| 6,651,589 B2 * | 11/2003 | Greeson ..................... 119/665 |

* cited by examiner

*Primary Examiner*—Peter M. Poon
*Assistant Examiner*—Elizabeth Shaw
(74) *Attorney, Agent, or Firm*—Stephen D. Carver

(57) ABSTRACT

A portable, towable livestock sprayer establishes a portal through which livestock move. A rigid, frame includes a removable tongue for connection to the draft vehicle. A pivoted, wheeled subframe hinged to the frame is switched between deployed or retracted orientations. The tongue fits to the subframe and functions as a leverage tool. With the sprayer properly positioned adjacent a livestock gate, a shroud assembly is deployed. Photo-eyes determine the presence and direction of travel of animals being sprayed. A pump system controls solution. The shroud transforms between a stable, compact transportation orientation, and a deployed orientation conformed to the required dimensions. Separate, extensible shroud wings are folded together during transportation, or separately deployed on opposite sides of the sprayer to block escape routes. Each wing comprises an inner section adapted to be removably coupled to the frame, and an outer section slidably telescoped to the inner section enabling width adjustments.

18 Claims, 12 Drawing Sheets

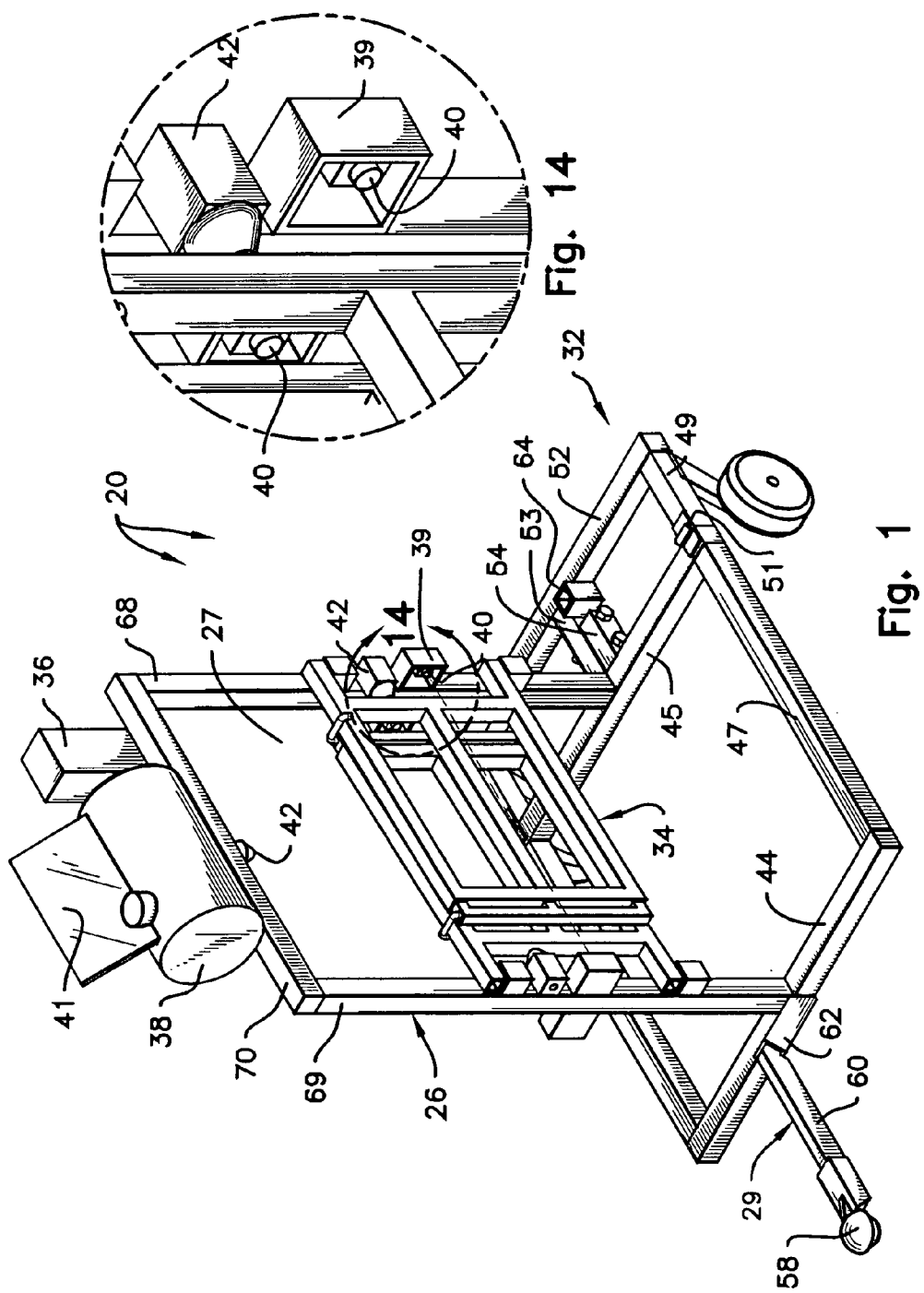

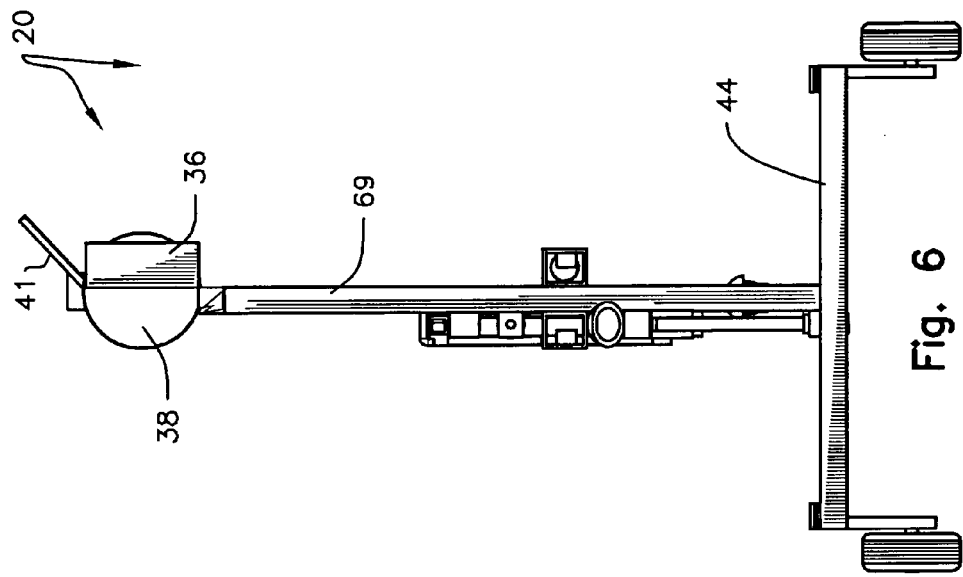
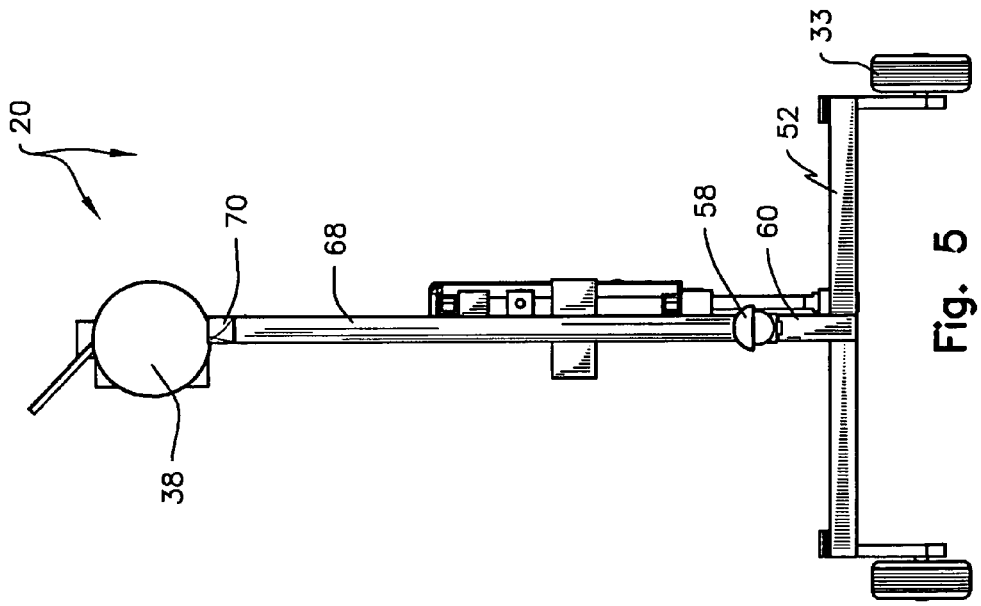

AUTOMATED WALK-THRU CATTLE SPRAYER

BACKGROUND OF THE INVENTION

I. Field of the Invention

The present invention relates generally to cattle sprayers for applying pesticides. More particularly, my invention relates to a walk-through cattle sprayer that automatically senses the presence and direction of roving livestock, and applies a uniform spray in response.

II. Description of the Prior Art

It is well recognized by farmers and ranchers that livestock must be periodically sprayed to combat parasites and reduce infection. For horse and livestock, ectoparasite infestation is a well-known affliction. Stable flies or horn flies are aggravating and troublesome, especially in the hot summer months. Fleas, ticks and mosquitoes are bothersome as well. Various species of flies and airborne pests can penetrate the hair of livestock and lay eggs in the skin or beneath the surface of the skin. The West-Nile virus, transmitted by mosquitoes, is another danger. Cattle can be especially vulnerable in the hot summer months. Numerous diseases are spread in this fashion. In dairy operations, fly infestation can also decrease milk production. Consequently, a variety of insecticides or treatments are known in the art. These may be applied by hand-spraying the animals, or automated spray devices may be employed to spray the animals upon detection. Animals may also be dipped, but the latter approach is cumbersome and inefficient.

Hand-operated sprayers are slow and cumbersome. Some portable models must be reloaded often, and they generally do not apply a uniform spray. Moreover, the repeated spraying of large herds is a difficult and labor intensive, time-consuming requirement. Accordingly, automated systems have been developed in the art. Typically, groups of animals are diverted to spraying areas in which fixed equipment is deployed.

U.S. Pat. No. 2,499,174, issued Feb. 28, 1950, discloses a spraying apparatus for livestock. The device is in the nature of a shower, whereby fluid may be dispersed under and over the cattle in order that they will be thoroughly coated with the fluid and, of course, the fluid may be impregnated with any of the well-known insecticides. An over-head shower is suspended above the animals.

U.S. Pat. No. 2,524,641, issued Oct. 3, 1950, discloses a portable sprayer for the treatment of livestock. The device is transported by a tow vehicle.

U.S. Pat. No. 2,542,280, issued Feb. 20, 1951, discloses an automatic spray chute for spraying cattle or other animals. The sprayer covers the animal entirely with the sprayed material, which is preferably directed "against the grain" of the animal's hair or fur.

U.S. Pat. No. 2,595,781, issued May 6, 1952, discloses another portable livestock or cattle spraying chute. Spray nozzles direct treatment solution against animals confined within the chute. The chute is mounted upon a wheeled carriage used for transporting the apparatus.

U.S. Pat. No. 2,684,658, issued Jul. 27, 1954, discloses a portable sprayer comprising an animal passageway through which the livestock to be sprayed pass. A plurality of spray nozzles disposed along the inner surfaces of the passageway direct fluid onto the animals.

U.S. Pat. No. 2,702,020, issued Feb. 15, 1955, describes a liquid applicator for applying disinfectants or liquid medical compounds to hogs, calves, and other animals. The invention consists of a cylindrical container from which absorbent flaps extend. These flaps directly contact animals walking under the applicator.

U.S. Pat. No. 3,071,111, issued Jan. 1, 1963, discloses a liquid applicator for dispensing liquid from a storage reservoir without pumps or valves. The dispensing is accomplished by gravity feed, but is constructed so that flow from the container is effectively checked and controlled during activation of the unit. By displacement of the apparatus through contact made by the animal, the flow of liquid is effectively controlled in order to prevent continuous and wasteful dispensing during such activation.

U.S. Pat. No. 3,108,574, issued Oct. 29, 1963, describes a cow washing and jet spray device and a controlling valve mechanism that is actuated by physical movement of the animal. The control mechanism opens the valve substantially and immediately upon initial physical impact.

U.S. Pat. No. 3,116,717, issued Jan. 7, 1964, describes a cattle insecticide applicator that includes flexible members saturated with insecticide or oil for directly wiping the animal. The apparatus is preferably deployed in a livestock pathway to be activated by passing animals.

U.S. Pat. No. 3,285,231, issued Nov. 15, 1966, utilizes a brush-like structure to physically wipe the back of animals passing through a confined passageway. Liquid insecticide is released when a valve is opened by the movement of the animals, and when the animal departs, the valve shuts off the system.

U.S. Pat. No. 3,541,996, issued Nov. 24, 1970, discloses an automatic sprayer that dispenses predetermined volumes of treating fluids when animals traverse a U-shaped housing surrounding the periphery of an entranceway. An elongated actuator arm is physically triggered by physical contact with animals.

U.S. Pat. No. 3,602,199, issued Aug. 31, 1971, discloses an automatic livestock sprayer activated by animal passage. Pressure cylinders provide regulated pressure and a constant spray rate.

U.S. Pat. No. 3,763,828, issued Oct. 9, 1973, shows a sprayer for applying liquid to a cow's udder. The device is triggered by animals moving through a narrow passageway. A photoelectric cell is positioned so that the light beam is broken when the cow's udder is above a spray nozzle.

U.S. Pat. No. 4,379,440, issued Apr. 12, 1983, discloses a portable livestock spraying apparatus which includes a confining chute and numerous spray nozzles. Similar patents include U.S. Pat. Nos. 4,669,425, 4,748,939, 4,978,861, 5,063,880, and 6,095,430.

However, so-called portable sprayers are often cumbersome and difficult to transport and deploy. Spraying operations are best served a reasonable distance away from feed stocks or watering holes, and often easily-accessible power outlets or water faucets are unavailable. When such units are extremely heavy, it may take more than a single workman to operate and deploy the apparatus. On the other hand, where the apparatus is too light and/or unstable, inadvertent contact with animals can dislodge or tip it over.

BRIEF SUMMARY OF THE INVENTION

My new cattle sprayer is deployed on a wheeled frame that can be quickly towed to an applicator site. This invention provides a portable, lightweight spray unit with a self contained electrical system and its own spray reservoir. It may be freely and quickly installed at varying locations about a ranch or farm by a single operator. Adjustable gates enable width compensation, so the unit can completely block and seal a gate or passage through which animals pass.

A removable tongue is releasably connected to the front of the frame for connection to a suitable draft vehicle. The frame comprises a hinged subframe equipped with a pair of wheels that pivots between positions. The subframe is deployed with the aid of the tongue, which is configured as a manipulative tool for use in deploying the subframe. The tongue removably attaches to a socket on the subframe. When so connected, the tongue may leverage the subframe to tilt it into a transportation orientation. The subframe includes means for pinning it into proper position relative to the main frame. With the sprayer properly positioned adjacent a livestock gate or trail, a shroud assembly is deployed to block any escape routes the livestock might otherwise have around the sprayer.

The frame supports an upright pair of stanchions defining a portal through which the livestock pass. Suitable photoeye apparatus determine not only the presence of an animal needing spraying, but the direction of travel and the total count of sprayed animals. By controlling the direction of travel, spray efficiency is maintained. For example, when a meadow has a pool or lake, cattle moving in this area will be sprayed only if they are moving away from the water, rather than towards it.

A pump and recirculation system controls the solution to be sprayed. When an animal is detected moving in the right direction, solution is vigorously sprayed upon cattle traversing the passageway. Nozzles are provided on both sides and on the top of the framework.

Importantly, the shroud can quickly be transformed between a stable, compact transportation orientation, and a deployed orientation conformed to the space requirements demanded. The assembly comprises a pair of separate, extensible wings that can either be folded adjacent one another, or separately deployed on opposite stanchions to extend away from the sprayer to block any space that animals might use to bypass the sprayer. Each wing comprises an inner section adapted to be removably coupled to the frames' vertical stanchions, and an outer section that is slidably telescoped to the inner wing section. As the twin wing sections are telescoped relative to one another, varying lengths are produced to customize the sprayer for paths and gates of different dimensions.

Measured amounts of fluid are dispensed by a control system that ensures proper application. Moreover, the presence and direction of animals traversing the apparatus is sensed and determined. Application occurs only when the animals are moving in the proper direction. For example, this "one way" feature insures that animals will be sprayed when leaving a pond or lake, rather than when they are on their way to bathe.

Thus, a fundamental object of my invention is to provide a portable sprayer device for automatically detecting livestock and applying a measured, uniform spray to combat insects and parasites.

Another basic object is to kill flies and other insects and pests.

Another fundamental object it to treat insect infestation in livestock.

Yet another object of the present invention to provide an automatic spraying device that checks to see that a desired direction of animal movement is attained.

A still further object is to provide a portable, automatic sprayer that can be user-adjusted to a dimension which effectively surmounts a desired passageway or entranceway through which animals pass.

A related object is to provide an automatic animal sprayer that electronically detects both the presence and direction of travel of an animal to be treated.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 1 is a frontal isometric view of my new sprayer, shown deployed for transportation, with portions thereof omitted for brevity or sectioned for clarity;

FIG. 5 is a front plan view thereof;

FIG. 6 is a rear plan view thereof;

FIG. 14 is an enlarged fragmentary isometric view of circled portion 14 in FIG. 1; and, FIG. 15 is an enlarged fragmentary isometric view of circled portion 15 in FIG. 1.

DETAILED DESCRIPTION OF THE INVENTION

Figure 15:
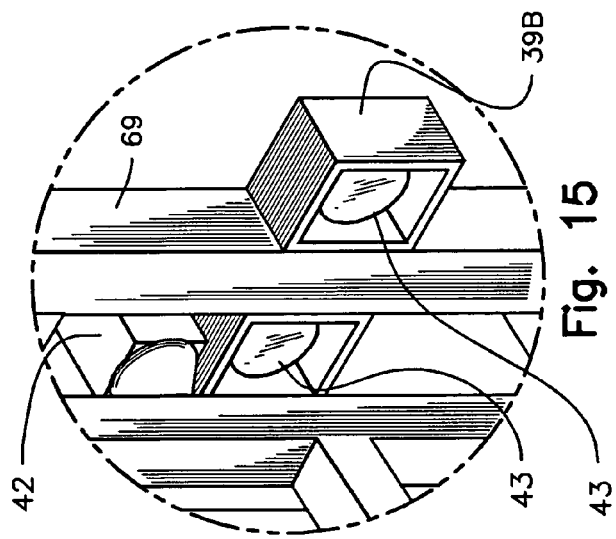

Turning now to the drawings, my new portable sprayer has been generally designated by the reference numeral 20. It is adapted for automatic use with a variety of livestock, including horses, cattle, sheep and the like. Sprayer 20 comprises a rigid frame 22 (FIG. 2) that is adapted to be disposed upon the ground 24 or other relatively flat supporting surface. Rigid, upright portal 26 that is vertically supported upon frame 22 defines a passageway 27 through which livestock moves to be sprayed. The sprayer is towed by attachment to a removable tongue 29 normally projecting from the front of the frame 22. The frame forms a towable carriage with subframe 32 that is pivotally coupled to the frame at the rear of the sprayer 20.

To tow the sprayer 20, the pivotal subframe 32 at the rear of the sprayer 20 is deployed as seen in FIG. 1, with wheels 33 (FIG. 2) fully contacting and rolling upon ground 24. When a desired spray location is reached, the subframe 32 is uncoupled and it pivots to the "out of the way," retracted position seen in FIGS. 8 and 9. When the sprayer 20 is properly positioned adjacent a livestock gate for spraying moving livestock, the shroud assembly 34 is unpacked and extended from the sides of the sprayer to block any escape pathways, insuring that the animals are all treated. However, the shroud assembly 34 is temporarily stored within the passageway area 27 and secured relative to the frame during transportation of the sprayer 20 between locations. When the sprayer reaches the desired operational destination, the shroud assembly 34 is then unconnected and deployed, as will hereinafter be described in detail.

The battery-powered control circuitry to be described hereinafter is located within housing 36 atop portal 26 for activating the sprayer 20. Photo eyes 40 detect the presence of cattle or livestock. Each photo eye unit contains a pair of photocell units aimed at a mirror on the opposite side of the portal. When an animal breaks the light return path, the presence of an animal is detected. However, as there are pair of units, the direction of animal travel is determined as well. The treatment solution to be sprayed (i.e., insecticide, pesticide or the like) is stored within tank 38 over portal 26. Upon appropriate detection, solution is vigorously sprayed upon cattle traversing the passageway 27, through nozzles 42, as explained in detail hereinafter. Solar collector panel 41 recharges the batteries (not seen) within housing 36.

With primary reference directed to FIGS. 1–2, 4 and 8–10, the welded, tube steel frame 22 (FIGS. 2, 9) is generally rectangular, comprising a front span 44, a rear span 45 (FIGS. 1, 9), and a pair of spaced apart and parallel sides 47 extending between front and rear spans 44, 45. The smaller, steel subframe 32 is also rectangular. The subframe legs 49 extending from opposite sides of subframe end 52 are pivotally coupled to frame sides 47 via hinges 51. When the subframe 32 is deployed for sprayer transportation and movement as in FIG. 2, it is parallel with the main frame 22. To this effect there is a middle subframe leg 53 disposed between the outermost subframe legs 49. Legs 49 and 53 are parallel. The rear span 45 of the main frame 22 has a short stub 54 projecting from it. When the subframe 32 is oriented parallel with the frame 22 during sprayer movements (i.e., as in FIGS. 1–3), the middle subframe leg 53 assumes a position parallel to and adjacent with stub 54, and is held by fasteners 56 (i.e., FIGS. 2, 4) are inserted between and through the aligned stub 54 and subframe middle leg 53 to pin and thus lock the subframe 32 relative to the frame 22.

Figure 2:
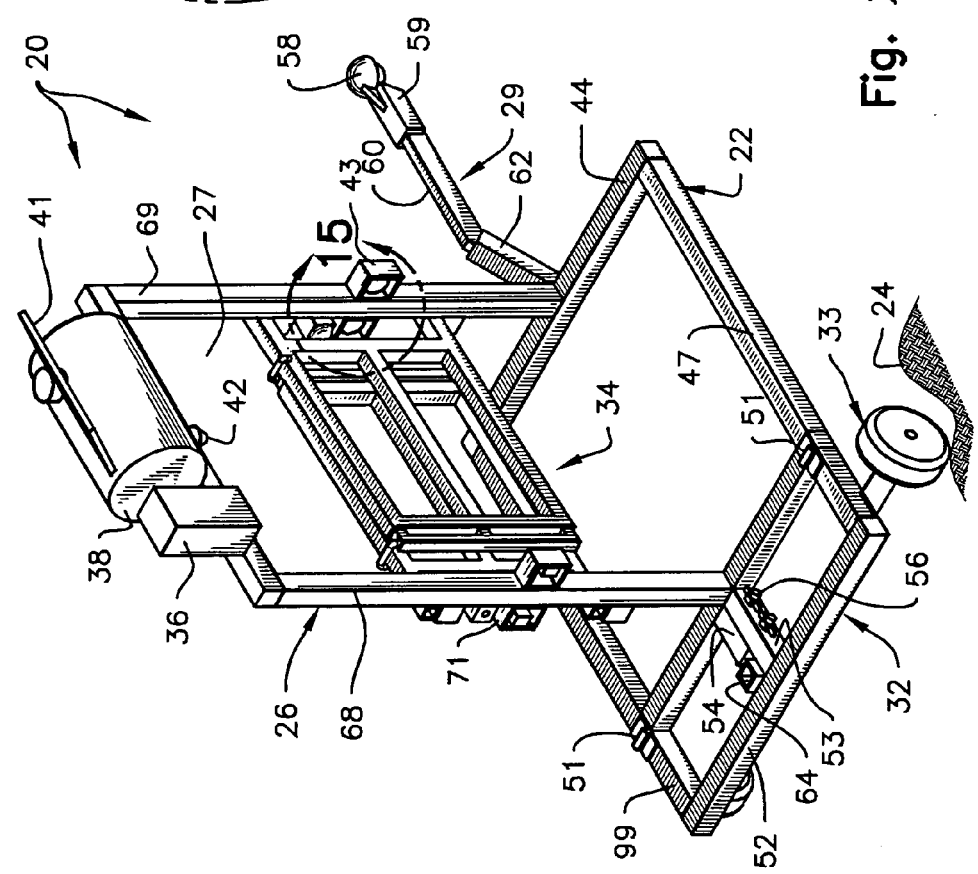
FIG. 2 is a rear isometric view thereof.
Figure 3:
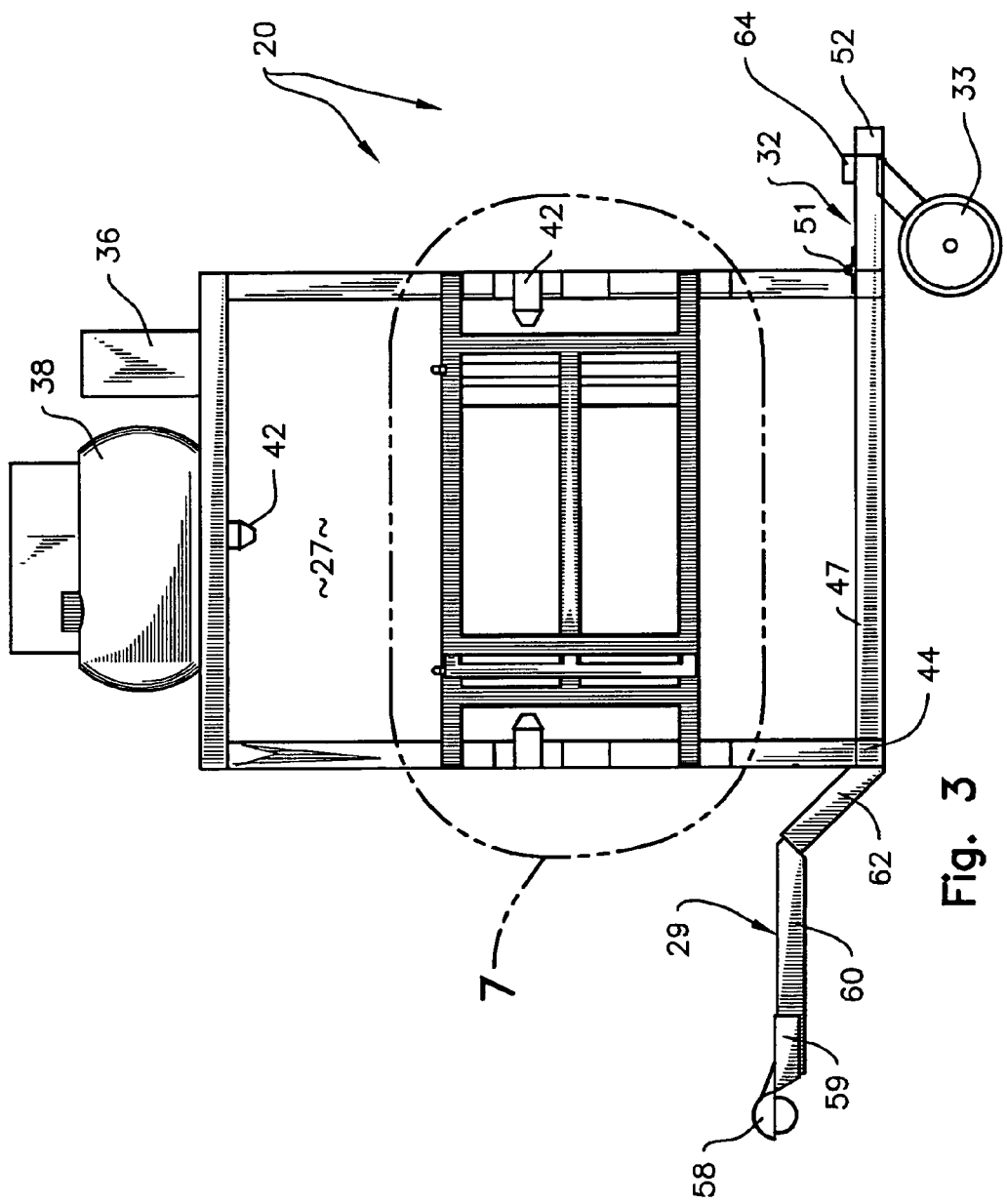
FIG. 3 is a side elevational view thereof.
Figure 4:
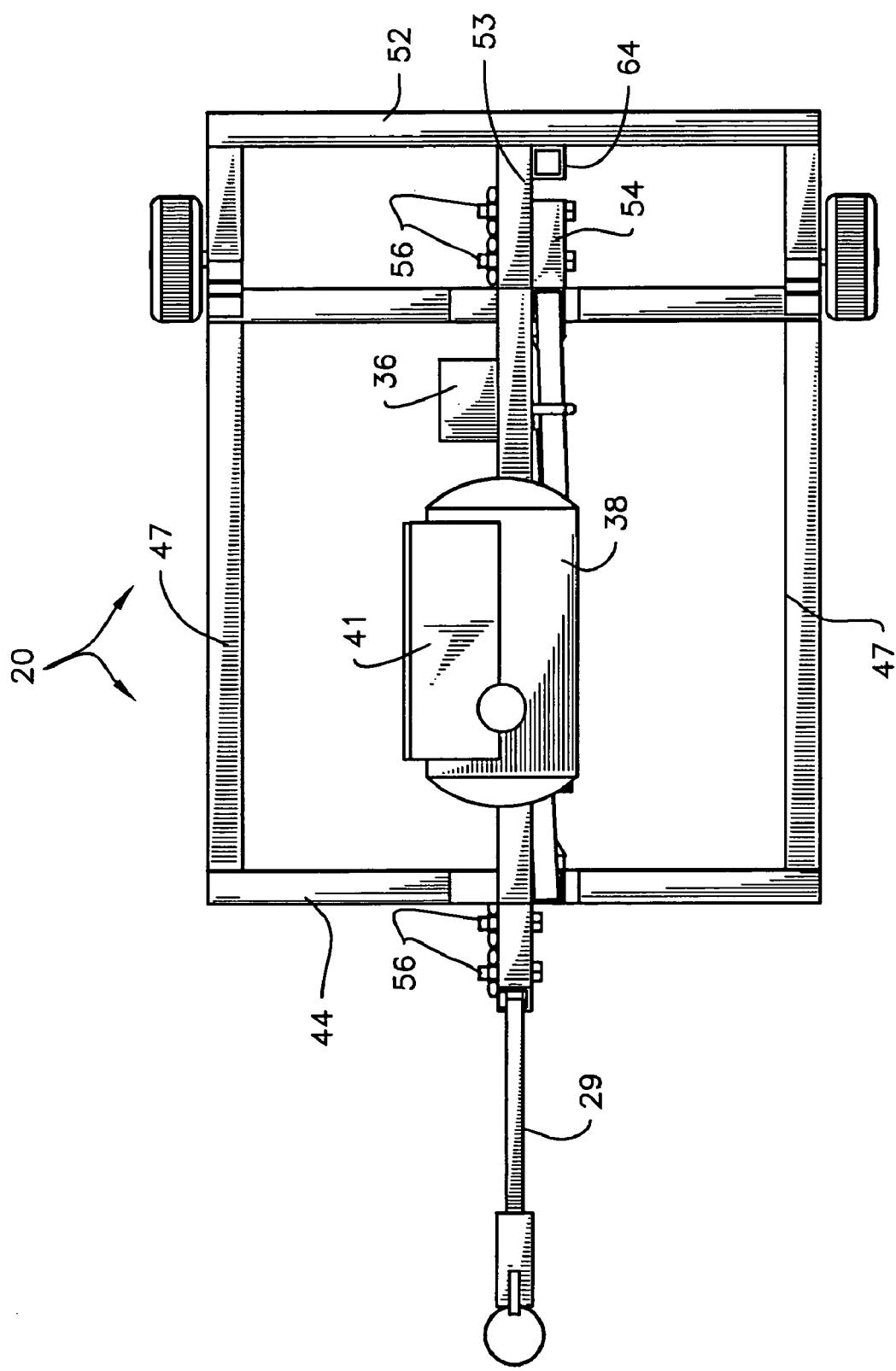
FIG. 4 is a top plan view thereof.
Figure 8:
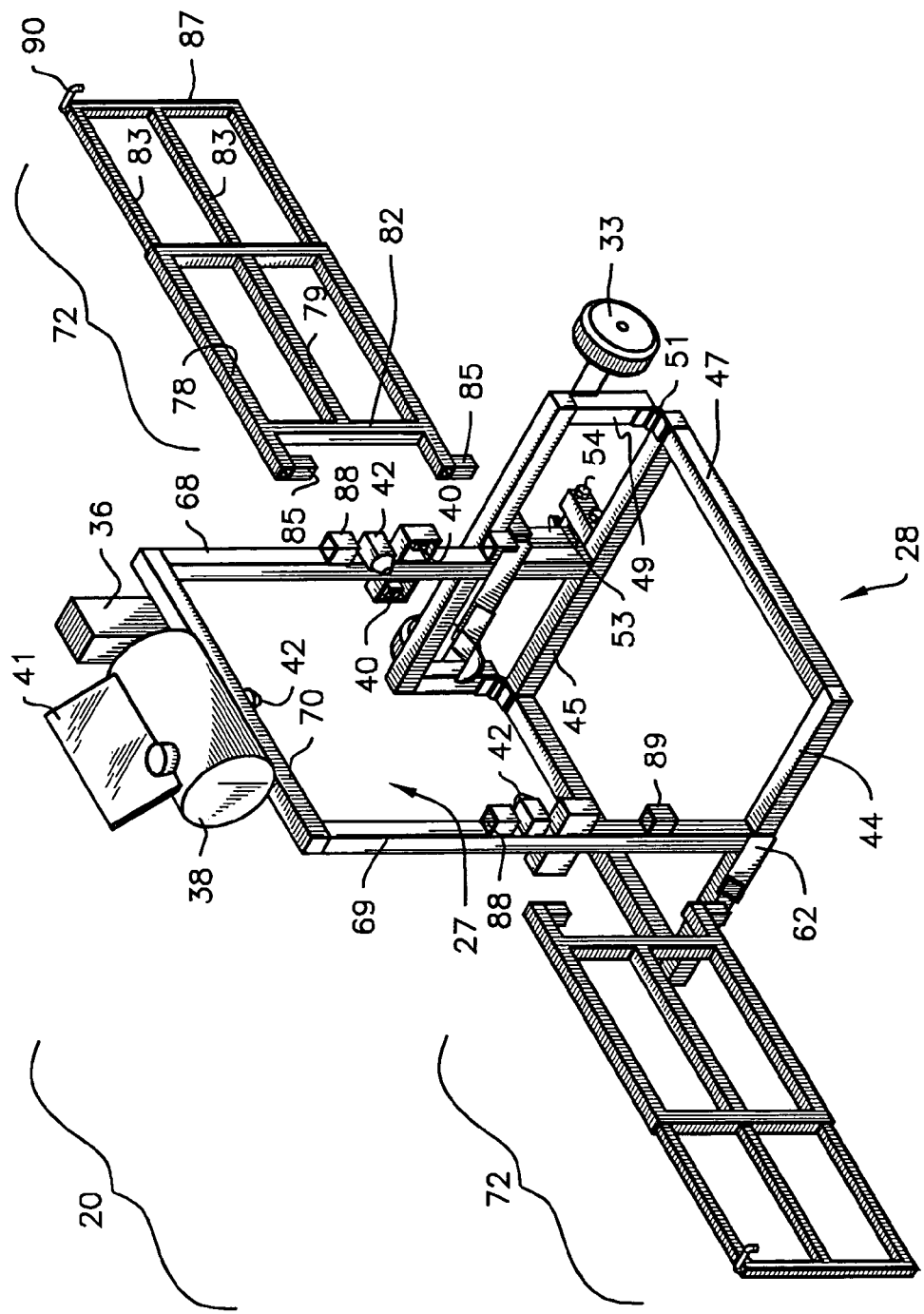
FIG. 8 is a partially exploded, isometric view showing the gates extended and detached, the draw tongue removed, and the transportation axle rotated to a rest position.

The towing tongue 29 is removable from the sprayer, and it has multiple functions. The conventional trailer socket 58 is secured on a conventional neck 59 (FIG. 2) that is connected to tongue shaft 60 (FIGS. 2, 8). A lower, angled terminal portion of the shaft 60 is slidably and releasably captivated within the angled anchor sleeve 62 (i.e., FIGS. 1–3, 8) welded to front frame span 44. When tongue 29 is coupled to sleeve 62 in this fashion and then pinned (and the subframe 32 is similarly secured within frame 22 as aforesaid), the entire sprayer may be conveniently towed about by a suitable tractor or "all terrain vehicle" (i.e., an "ATV") which is coupled to the tongue in the usual manner. Given the weight and construction of the sprayer 20 as discussed, an ATV like a Honda Model 400 four wheel drive unit is more than adequate.

However, the tongue 29 has an important alternative function. After the sprayer 20 is towed to a suitable location, the tongue 29 can be removed from sleeve 62 (i.e., FIGS. 1, 3) for use as a lever to manipulate the subframe, as seen in FIG. 10. It will be noted that the subframe 32 supports an alternative square socket 64 (i.e., FIG. 1). When the tongue 29 is inverted and then inserted into subframe socket 64, the subframe can be manipulated to deflect and align the previously described subframe leg 53 and stub 54. This enables the fasteners 56 to be inserted or withdrawn. When the sprayer is transformed into the operational position of FIGS. 8, 9, the subframe 32 pivots upwardly about hinges 51 when the fasteners 56 are removed, and subframe is forced by gravity away from its former parallel orientation with respect to the flat and stationary frame 22. When the subframe is to be moved back into the transportation position (i.e., from the position of FIG. 8 to that of FIG. 2), tongue 29 is positioned as in FIG. 10. The tongue engages socket 64 (FIGS. 2, 4) and shaft portion 60 functions as a lever for manually manipulating and facing the subframe 32 back into position with wheels 33 contacting the ground and elevating the sprayer. Hand manipulation occurs just prior to reinstalling the wing-nut fasteners 56 to pin the subframe into the transportation position.

The upright portal 26 surrounds the passageway 27 through which livestock to be treated pass. Two parallel, vertically upright stanchions, 68, 69, respectively, are welded to frame spans 45 and 44. A rigid upper strut 70 (FIG. 1) transversely extends between stanchions 68 and 69, forming the top of portal 26. Strut 70 supports tank 38, control housing 36, and the solar collector panel 41 on its top, as well as the spray nozzle 42 which is mounted on its underside facing downwardly towards passageway 27. Other spray nozzles 42 are also secured to stanchions 68 and 69, and they face inwardly towards the passageway 27. Livestock 67 (FIG. 11) detected within the passageway are treated with vigorous spray patterns 61 (FIG. 11) established by the cooperating nozzles 42. To prevent dripping, leakage, or siphoning through the nozzles when the sprayer (i.e., the pump) is turned "off", each spray nozzle 42 includes an internal check valve nominally rated at twenty pounds. Fluid can only be sprayed through the nozzles 42 in response to predetermined line pressure.

A pair of spaced-apart photo eyes 40 is mounted within housing 39 on stanchion 68 (FIGS. 1, 14). The photo eyes 40 direct a beam of light across the portal and passageway 27 towards a companion pair of reflectors 43 (FIGS. 2, 15) mounted in a similar housing 39B (FIG. 15) on stanchion 69. Preferably three-inch diameter, center-mounted Allen Bradley model 92-39 reflectors are used.

By using a pair of photo eyes and a pair of companion reflectors, the direction of travel, rather than the mere presence of an animal, is ascertained. Each Allen Bradley brand photo eye 40 comprises a light emitter and a companion sensor. Light directed across the portal towards the reflectors 43 is normally reflected back and sensed, in the absence on an animal, whose presence breaks the return path of reflected light. Depending upon which of the two sensors first detects "breaking" of the normal beam pattern, not only the presence of an animal is detected, but the direction of animal travel is determined as well. As explained hereinafter, the control system will not initiate a spray sequence unless the direction of travel is correct.

Figure 7:
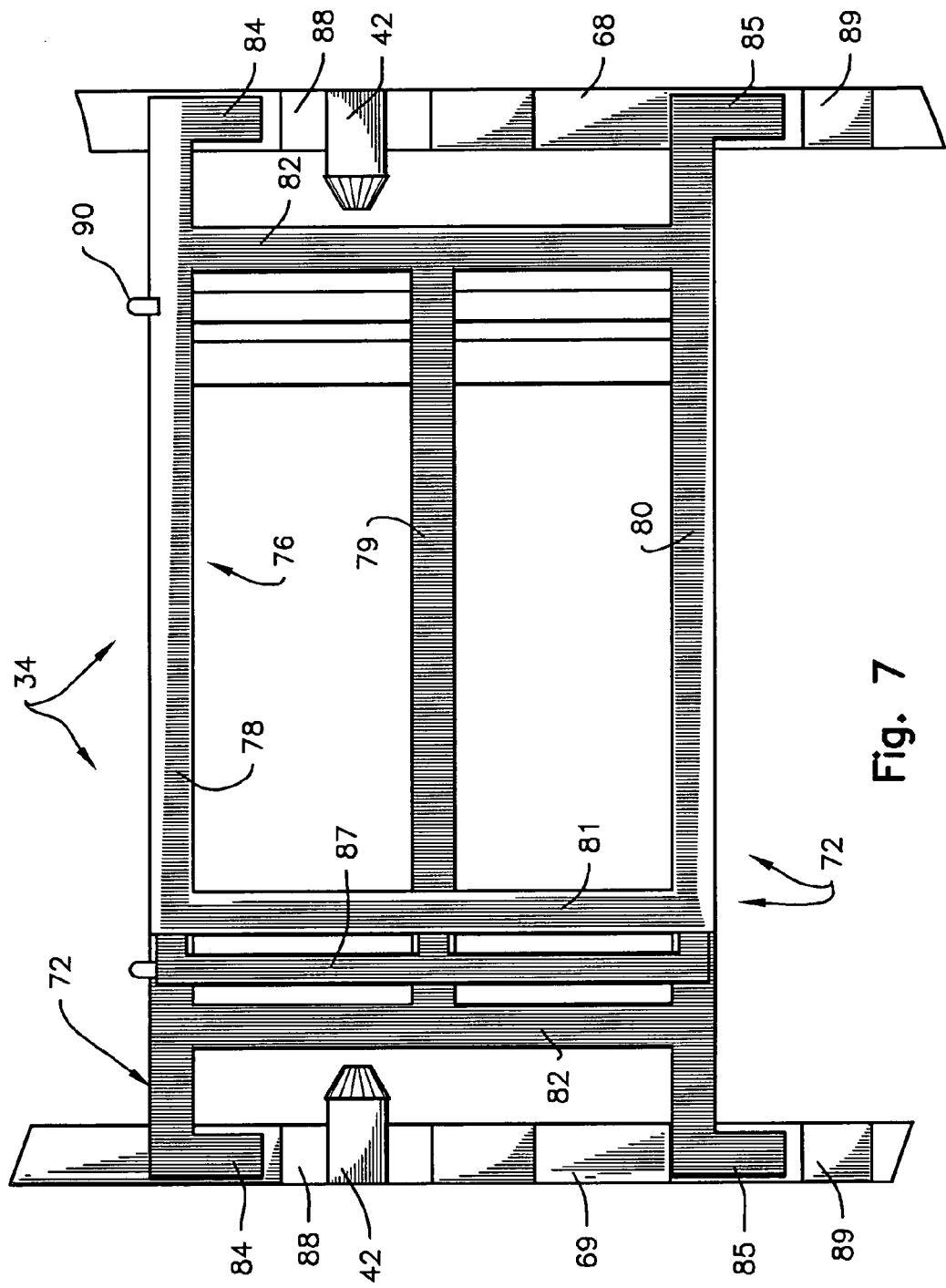
FIG. 7 is an enlarged, fragmentary front elevational view of the gate structure, with the shroud assembly shown partially deflected vertically and upwardly, as it appears just prior to deployment and unfolding.
Figure 11:
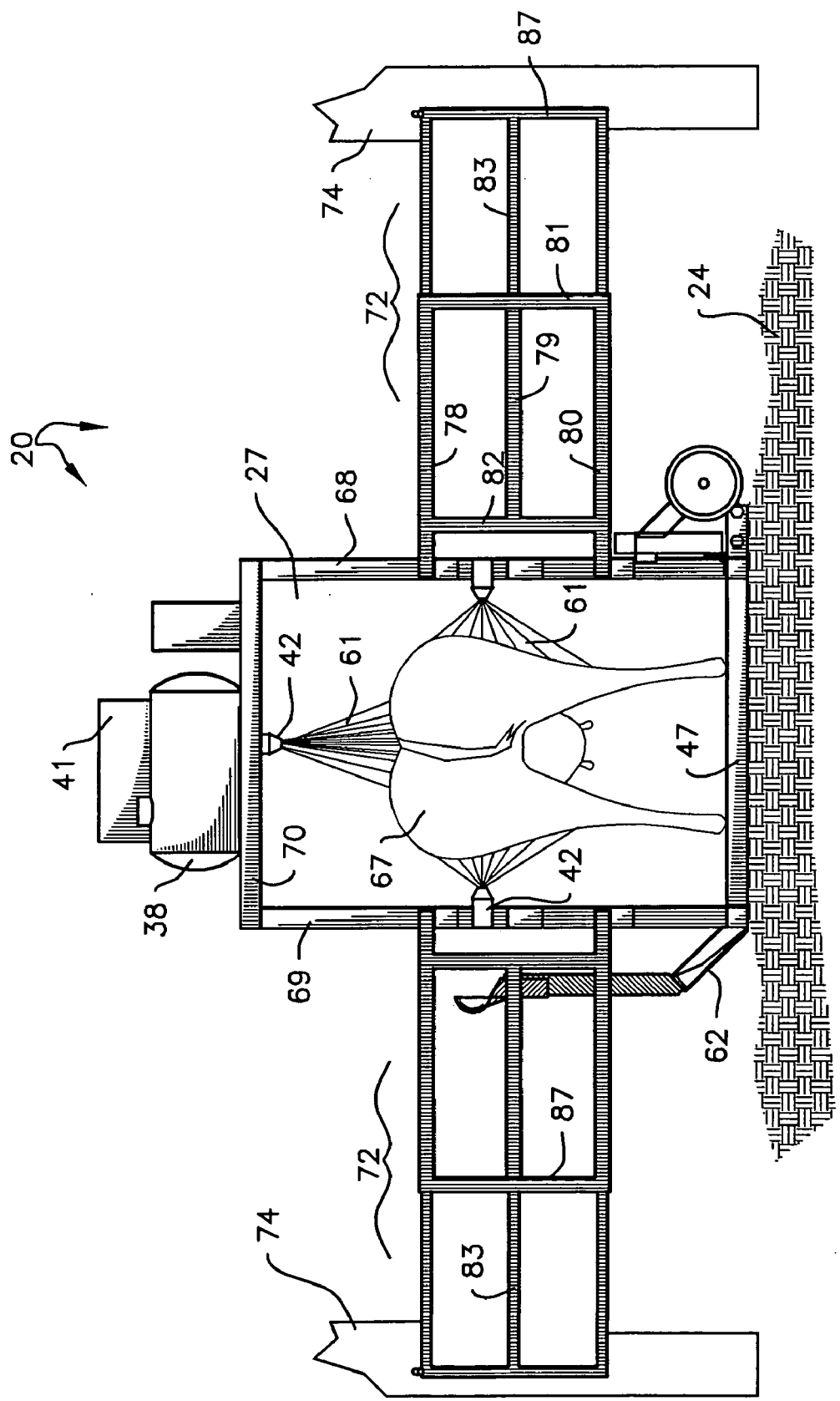
FIG. 11 is a partially fragmented, front elevational view of the operating unit.

The shroud assembly 34 comprises a pair of separate, extensible wings 72 (i.e., FIG. 8). With primary reference directed now to FIGS. 7–9 and 11, each wing 72 is identical. The purpose of the wings 72 is to shroud that portion of an animal path that is between the sprayer 20 and adjacent structure, such as posts 74 (FIG. 11). Each wing 72 comprises an inner section 76 adapted to be coupled to one of the vertical stanchions 68 or 69, and an outer, extensible section 77 that is slidably telescoped to section 76. Preferably, each inner wing section 76 comprises three spaced-apart and parallel rails 78, 79, 80 extending horizontally between vertical ends 81, 82 (i.e., FIG. 7). Rails 78 and 80 terminate inwardly in L-hooks 84, 85 respectively (FIG. 7) that project downwardly towards sleeves 88, 89. Pairs of sleeves 88, 89 are welded in spaced relation upon both stanchions 69 and 68. Outer wing sections 77 preferably comprise three spaced apart and parallel horizontal rails 83 welded to an end piece 87. Rails 83 are slidably, coaxially telescoped to rails 78, 79, 80 of the inner wing sections 76.

Figure 9:
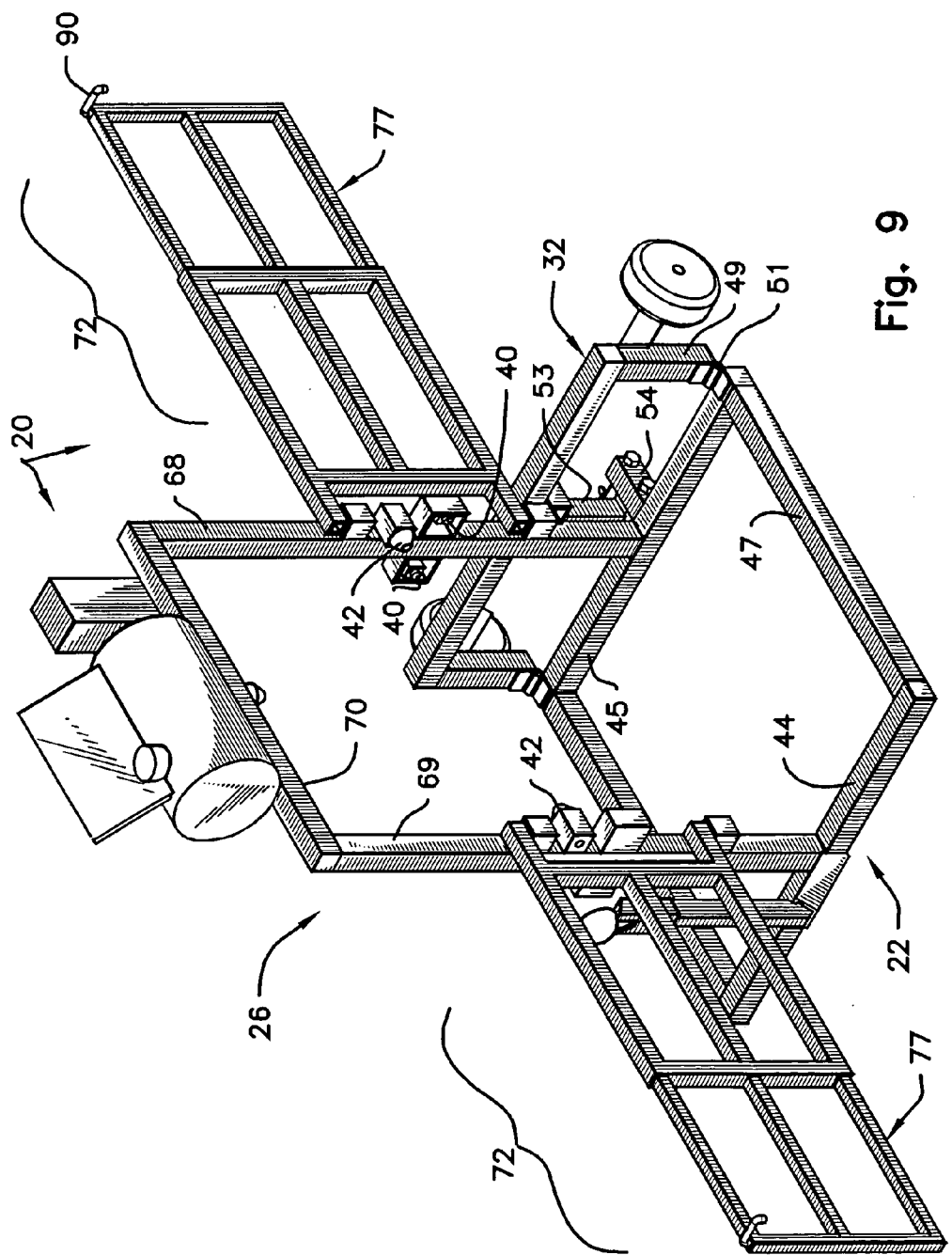
FIG. 9 is an isometric view similar to FIG. 8, but showing the gates deployed, the draw tongue removed, and the transportation axle disposed in a rest position.
Figure 10:
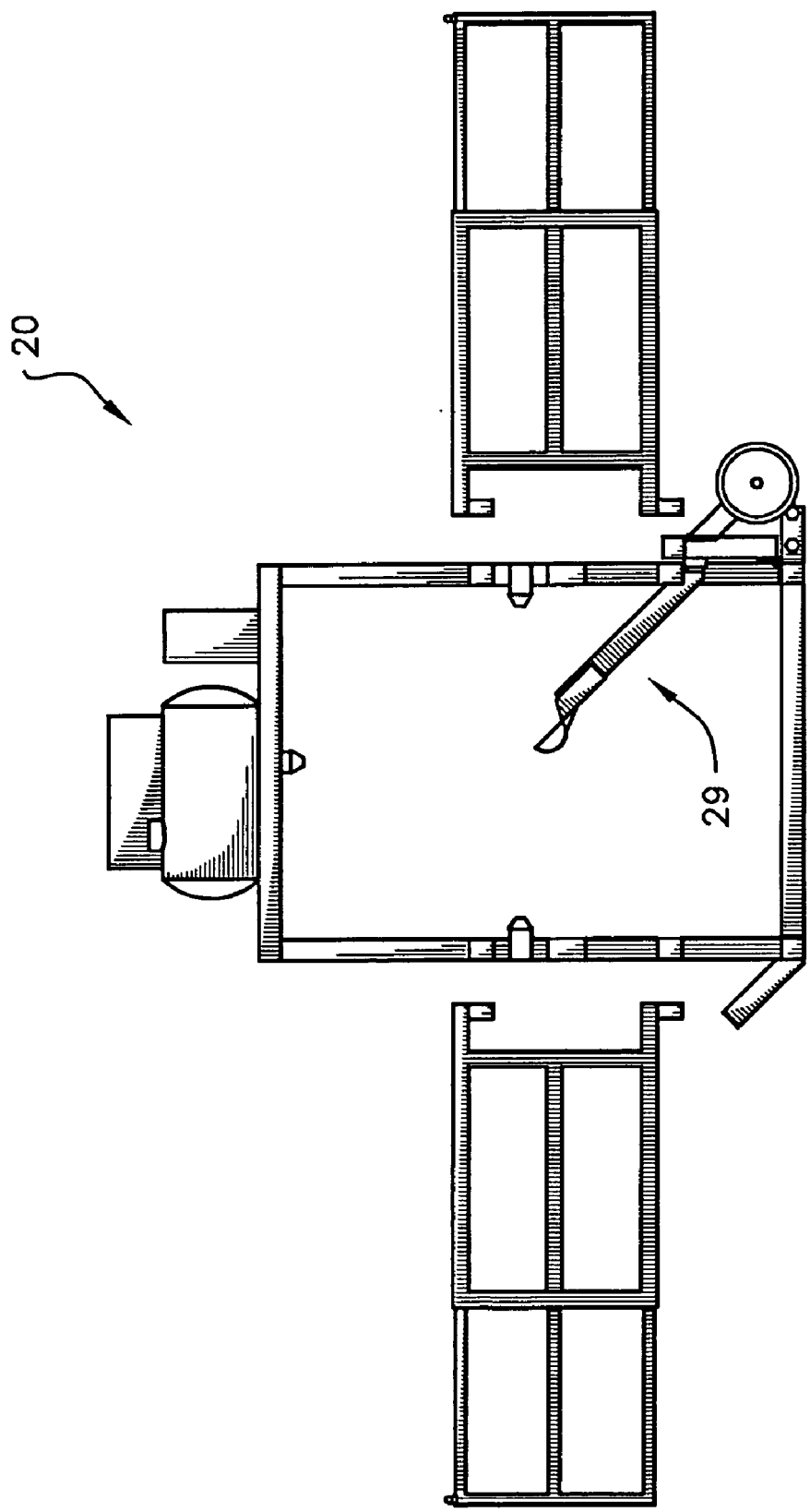
FIG. 10 is a partially exploded front elevational view similar to FIG. 8, but showing the draw tongue deployed in a position for leveraging and deploying the transportation axle.

When inner and outer wing sections are telescoped together for transportation (i.e., as in FIG. 1), abutting wings are held folded together in flat, abutting relation place by projecting clasps 90 (i.e., FIGS. 8, 9). In the transportation mode of FIGS. 1 and 7, the twin wings 72 are folded adjacent one another and positioned substantially as in FIG. 7, such that the hooks 84, 85 mate within and are captivated by the sleeves 88, 89. When deployed outwardly for spraying operations, the wings 72 are oriented and manipulated as illustrated in FIGS. 8, 9, such that they project laterally away from the stanchions 68, 68, with L-hooks 84, 85 appropriately aligned with and mated to sleeves 88, 89, and with the formerly telescoped sections pulled apart to shroud the areas adjacent the sprayer.

Figure 12:
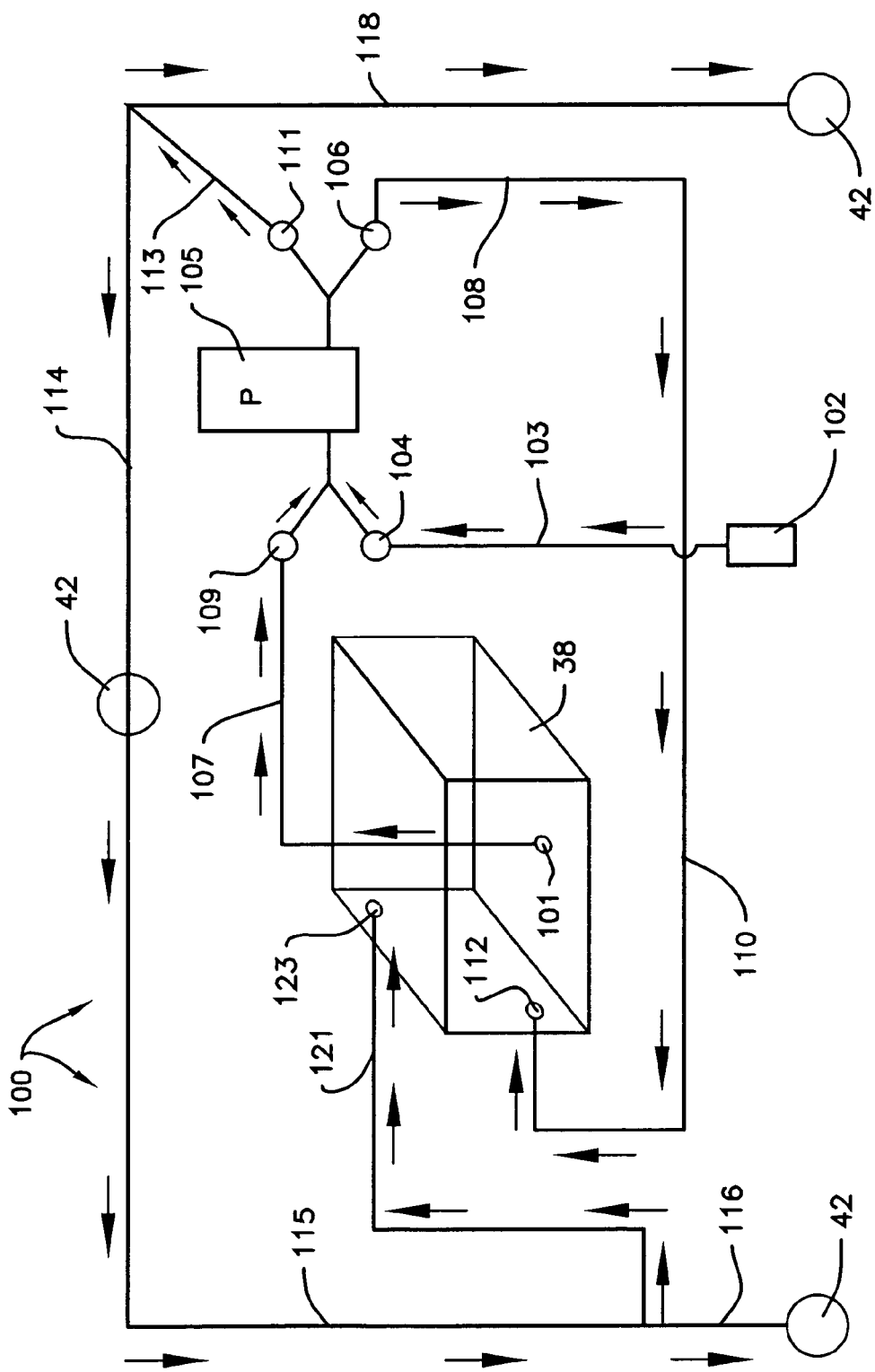
FIG. 12 is a diagrammatic view illustrating the fluid control circuit.

The fluid control and flow circuit has been generally designated by the reference numeral 100 (FIG. 12). Where practicable, reference numerals used previously to indicate hardware items are used again to designate the same parts in schematic form. Reservoir tank 38 stores a volume of insecticide to be applied as aforesaid.

To load tank 38, solution may be suctioned from a user-supplied, external container 102 via a line 103 through manually operated first control valve means comprising valves 104 and 109. Valve 104 connects to the twelve-volt D.C. pump 105 via a conventional T-connection. Electric pump 105 fills tank 38 through manual valve 106 that outputs via lines 108, 110 into tank inlet 112. At this time manual valves 109 and 111 remain closed. After filling tank 38, manual valves 104 and 106 are closed, and the second control valve means (i.e., comprising valves 109 and 111 is opened.

With valves 109 and 111 open, solution may be sprayed. Fluid is drawn from tank 38 via strainer/check-valve 101 through line 107 and valve 109 into pump 105, which outputs through opened valve 111 and lines 113, 114, 115, 116 and 118 to spray nozzles 42. A return bleed-off line 121 communicates with check-valve equipped. tank nozzle 123 to vent overpressure, recycling fluid to tank 38. Spraying occurs when the pump 105 is actuated by the controller to be described hereinafter, after tank 38 is filled, and valves 109 and 111 are opened.

Figure 13:
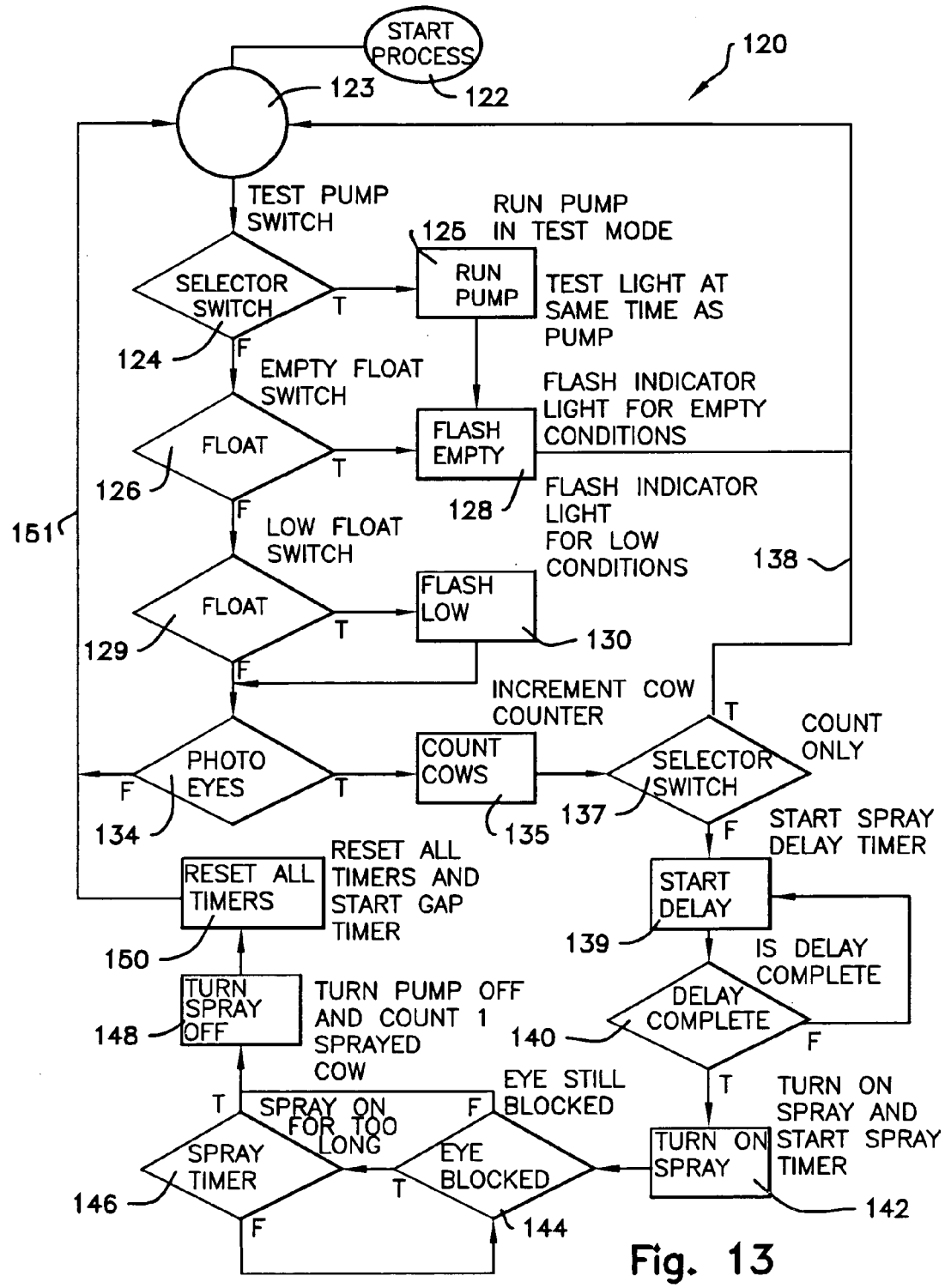
FIG. 13 is a schematic flow diagram showing the software logic implemented by the controller.

The controller circuitry implements the logic of FIG. 13 through a programmable Allen Bradley model 1760-L-12DWD controller disposed within housing 36. The software control program has been generally designated by the reference numeral 120 (FIG. 13). Program initiation is manually switched "on" as indicated by step 122, thereby energizing node 123. A "test mode" switch is turned on in step 124 to bypass the sensing circuitry; this is done when filling the tank 38 or testing it. If the test mode switch 124 is "on," the pump 105 (i.e. FIG. 12) is energized per step 125. In step 126 a first, conventional level-measuring float within solution tank 38 (i.e., FIG. 1) is queried; if the tank is empty, a warning light is flashed in step 128, warning of an empty tank. If the tank is empty, the controller does not actuate the pump. A separate float within the tank can sense a "low tank" condition in step 129, it is indicated by warning lights flashed in step 130. When solution is "low," the tank 38 should be filled as discussed above.

Step 122 also initiates an animal counting function if the test mode switch in step 124 is "off." Photo eyes 40 are queried in step 134 to determine animal presence, and the right direction of travel. Of the two sensor paths in the assemblies, the first signal must be derived from the appropriate sensor to determine if the travel direction is right. If the travel direction is right, the count is made in step 135. The operator must input a manual decision by activating a "count only" switch in step 137; if "true" (i.e., animals are counted but not sprayed), a return occurs on line 138. If "false" (i.e., spraying should commence), then step 139 implements a delay timer so that spray does not get in the face of the animals. Delay completion is sensed at 140; if an appropriate selected time interval has elapsed, step 142 turns on the sprayer and starts a spray counter. Step 142 thus energizes pump 105 after valves 109, 111 (FIG. 12) are first manually opened.

Step 144 monitors the photo eye assemblies 40 to make sure an animal is still present (i.e., that the optical path across the portal is still blocked.) Timing step 146 monitors the length of time that spray is applied. If the sprayer is on too long (i.e., pump 105 is running) or if the animal being sprayed exits the portal, then a turn-off step 148 occurs. This causes a timer reset in step 150, returned on line 151, and the circuit 120 looks for a new animal, whereupon the process is repeated.

From the foregoing, it will be seen that this invention is one well adapted to obtain all the ends and objects herein set forth, together with other advantages which are inherent to the structure.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:
1. A portable livestock sprayer comprising:
   a rigid frame adapted to be disposed upon a supporting surface during sprayer operation;
   a portal vertically defined above the frame defining a passageway through which livestock may move;
   a wheeled subframe pivoted to the frame that is transformable between a first, deployed orientation substantially parallel with the frame during sprayer towing, and a second, retracted orientation out of contact with said supporting surface during sprayer operation;
   a tank containing solution to be sprayed upon livestock;
   nozzle means for selectively spraying livestock;
   pump means for selectively forcing said solution through said nozzle means;
   control means for operating the sprayer, the control means comprising photo-eye means for detecting the presence of livestock to be sprayed, and;
   a shroud assembly adapted either to be coupled to the frame during sprayer transportation or deployed for preventing livestock from bypassing said portal, said shroud assembly comprising a pair of separate, extensible wings, each wing comprising an inner section adapted to be coupled to the frame and an outer, extensible section slidably telescoped to the inner section.

2. The sprayer as defined in claim 1 wherein:
said photo-eye means comprises means for determining the direction of travel of livestock through said portal; and,
said control means activates said sprayer pump means only when livestock is traveling in the desired direction.

3. The sprayer as defined in claim 1 wherein the frame comprises a stub to which the subframe may be temporarily pinned to secure the subframe substantially parallel with the frame during sprayer movements.

4. The sprayer as defined in claim 1 further comprising a tongue removably coupled to the frame for coupling to a tow vehicle, and wherein the subframe comprises a sleeve adapted to removably receive said tongue for manipulating and pivoting the subframe.

5. The sprayer as defined in claim 4 wherein:
said photo-eye means comprises means for determining the direction of travel of livestock through said portal; and,
said control means activates said sprayer pump means only when livestock is traveling in the desired direction.

6. A portable livestock sprayer comprising:
a rigid towable, frame adapted to be disposed upon a supporting surface;
a passageway through which livestock may move;
a fluid control circuit comprising:
a tank for storing solution to be sprayed upon livestock;
nozzle means for selectively spraying livestock;
pump means for transferring fluid into or out of said tank;
first valve means for enabling fluid to be suctioned into said tank by said pump means from an external source;
second valve means for enabling said pump means to actuate said nozzle means; and,
controller means for operating the sprayer, said controller means comprising:
photo-eye means for detecting the presence of livestock to be sprayed; and,
means for activating said pump means in response to said photo-eye means; and,
a shroud assembly adapted either to be coupled to the frame during sprayer transportation or deployed for preventing livestock from bypassing said passageway, said shroud assembly comprising a pair of separate, extensible wings, each wing comprising an inner section adapted to be coupled to the frame and an outer, extensible section slidably telescoped to the inner section.

7. The sprayer as defined in claim 6 wherein said controller means comprises means for initiating a test mode to determine if said tank is empty or low.

8. The sprayer as defined in claim 6 wherein said controller means comprises means for counting animals.

9. The sprayer as defined in claim 6 wherein said photo-eye means comprises a pair of spaced apart photo eyes, and said controller means comprises means for determining the direction of animal travel and means for activating said pump means if the direction is right.

10. The sprayer as defined in claim 6 further comprising a wheeled subframe pivoted to the frame and wherein the frame comprises a stub to which the subframe may be temporarily pinned to secure the subframe substantially parallel with the frame during sprayer movements.

11. The sprayer as defined in claim 6 further comprising a wheeled subframe pivoted to the frame and a tongue removably coupled to the frame for coupling to a tow vehicle, and wherein the subframe comprises a sleeve adapted to removably receive said tongue for manipulating and pivoting the subframe.

12. The sprayer as defined in claim 11 wherein said controller means comprises means for initiating a test mode to determine if said tank is empty or low.

13. The sprayer as defined in claim 12 wherein said controller means comprises means for counting animals.

14. The sprayer as defined in claim 13 wherein said photo-eye means comprises a pair of spaced apart photo eyes, and said controller means comprises means for determining the direction of animal travel and means for activating said pump means if the direction is right.

15. A portable livestock sprayer comprising:
a rigid frame adapted to be disposed upon a supporting surface during sprayer operation;
a portal vertically defined above the frame defining a passageway through which livestock may move;
a wheeled subframe pivoted to the frame that is transformable between a first, deployed orientation substantially parallel with the frame during sprayer towing, and a second, retracted orientation out of contact with said supporting surface during sprayer operation;
a tank containing solution to be sprayed upon livestock;
nozzle means for selectively spraying livestock;
pump means for selectively forcing said solution through said nozzle means;
controller means for operating the sprayer, the controller means comprising photo-eye means for detecting the presence of livestock to be sprayed; and,
a tongue removably coupled to the frame for coupling to a tow vehicle, the subframe comprising a sleeve adapted to removably receive said tongue for manipulating and pivoting the subframe.

16. The sprayer as defined in claim 15 wherein:
said photo-eye means comprises means for determining the direction of travel of livestock; and,
said controller means activates said sprayer pump means only when livestock is traveling in a desired direction through said portal.

17. A portable livestock sprayer comprising:
a rigid, portable frame adapted to be disposed upon a supporting surface during sprayer operation;
a portal defining a passageway through which livestock may move;
a tank supported by the frame for containing solution to be sprayed upon livestock;
nozzle means for selectively spraying livestock within said portal;
pump means for selectively forcing said solution from said tank through said nozzle means;
first valve means for enabling fluid to be suctioned into said tank by said pump means from an external source;
second valve means for enabling said pump means to actuate said nozzle means;
controller means for operating the sprayer, said controller means comprising:
photo-eye means for detecting the presence of livestock to be sprayed; and,
means for activating said pump means in response to said photo-eye means;

wherein said photo-eye means comprises means for determining the direction of travel of livestock; and,
said controller means activates said sprayer pump means only when livestock is traveling in a desired direction.

18. The sprayer as defined in claim 17 wherein said controller means comprises means for counting animals.

* * * * *